United States Patent
Seo

(10) Patent No.: US 10,764,807 B2
(45) Date of Patent: Sep. 1, 2020

(54) COMMUNICATION METHOD FOR HIGH-SPEED MOVING VEHICLE IN WIRELESS COMMUNICATION SYSTEM, AND APPARATUS FOR SAME

(71) Applicant: LG ELECTRONICS INC., Seoul (KR)

(72) Inventor: Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/312,121

(22) PCT Filed: Jun. 23, 2017

(86) PCT No.: PCT/KR2017/006635
§ 371 (c)(1),
(2) Date: Dec. 20, 2018

(87) PCT Pub. No.: WO2017/222332
PCT Pub. Date: Dec. 28, 2017

(65) Prior Publication Data
US 2019/0208567 A1  Jul. 4, 2019

Related U.S. Application Data

(60) Provisional application No. 62/354,103, filed on Jun. 23, 2016.

(51) Int. Cl.
*H04W 16/28* (2009.01)
*H04W 24/08* (2009.01)
(Continued)

(52) U.S. Cl.
CPC ........... *H04W 36/32* (2013.01); *H04W 16/28* (2013.01); *H04W 24/08* (2013.01); *H04W 24/10* (2013.01);
(Continued)

(58) Field of Classification Search
CPC . H04B 7/02–0617; H04L 5/003–0098; H04W 4/40–70; H04W 16/28;
(Continued)

(56) References Cited

U.S. PATENT DOCUMENTS

2011/0250896 A1   10/2011  Takano
2013/0021929 A1*  1/2013  Kim ...................... H04B 7/024
                                                                  370/252
(Continued)

FOREIGN PATENT DOCUMENTS

KR   10-2008-0083939 A   9/2008
KR   10-2010-0035965 A   4/2010
(Continued)

Primary Examiner — Timothy J Weidner
(74) Attorney, Agent, or Firm — Dentons US LLP

(57) ABSTRACT

In the present application, disclosed is a method for a user equipment, that is moving at high speed from a first base station to a second base station, to transmit and receive signals in a wireless communication system. Specifically, the method comprises the steps of: when a measurement value from the first base station is less than or equal to a first threshold value, monitoring a transmission of a first signal from the second base station; when the transmission of the first signal is detected, transmitting a response signal to the first signal to the second base station; and receiving a second signal from the second base station that has received the response signal.

6 Claims, 10 Drawing Sheets

(51) Int. Cl.
*H04W 24/10* (2009.01)
*H04W 36/00* (2009.01)
*H04W 36/30* (2009.01)
*H04W 36/32* (2009.01)
*H04W 72/04* (2009.01)
*H04W 76/25* (2018.01)
*H04W 92/10* (2009.01)
*H04W 92/20* (2009.01)

(52) U.S. Cl.
CPC ... *H04W 36/0058* (2018.08); *H04W 36/0061* (2013.01); *H04W 36/0072* (2013.01); *H04W 36/0085* (2018.08); *H04W 36/00835* (2018.08); *H04W 36/00837* (2018.08); *H04W 36/30* (2013.01); *H04W 72/046* (2013.01); *H04W 72/0453* (2013.01); *H04W 76/25* (2018.02); *H04W 92/10* (2013.01); *H04W 92/20* (2013.01)

(58) Field of Classification Search
CPC ..... H04W 24/02–10; H04W 28/02–26; H04W 36/0005–385; H04W 40/34–38; H04W 48/02–20; H04W 56/001–0025; H04W 72/04–10; H04W 74/002–0891; H04W 76/10–38; H04W 84/005; H04W 84/18–22; H04W 88/06; H04W 92/02; H04W 92/04; H04W 92/10; H04W 92/16; H04W 92/20
See application file for complete search history.

(56) References Cited

U.S. PATENT DOCUMENTS

| | | | | |
|---|---|---|---|---|
| 2015/0208311 | A1* | 7/2015 | Lee | H04W 36/30 |
| | | | | 455/436 |
| 2016/0073318 | A1* | 3/2016 | Aguirre | H04W 36/32 |
| | | | | 455/436 |
| 2016/0113023 | A1* | 4/2016 | Zhou | H04W 72/082 |
| | | | | 370/329 |
| 2018/0332520 | A1* | 11/2018 | Cheng | H04W 36/0058 |
| | | | | 370/331 |

FOREIGN PATENT DOCUMENTS

| | | |
|---|---|---|
| KR | 10-2014-0128456 A | 11/2014 |
| KR | 10-2015-0140203 A | 12/2015 |

* cited by examiner

FIG. 2
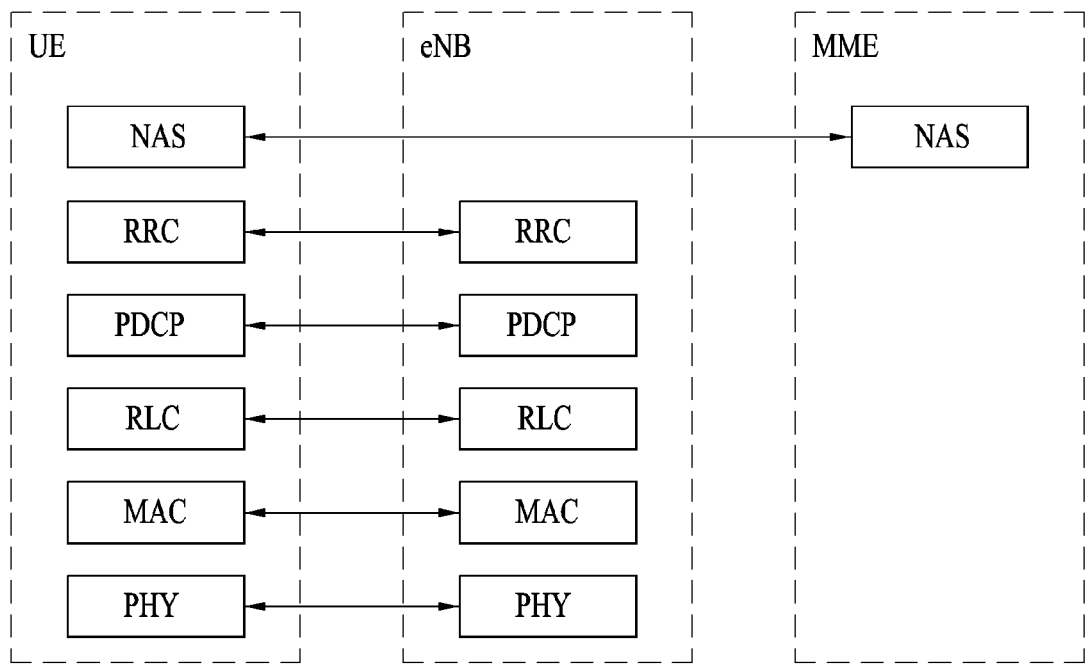
(A) CONTROL-PLANE PROTOCOL STACK
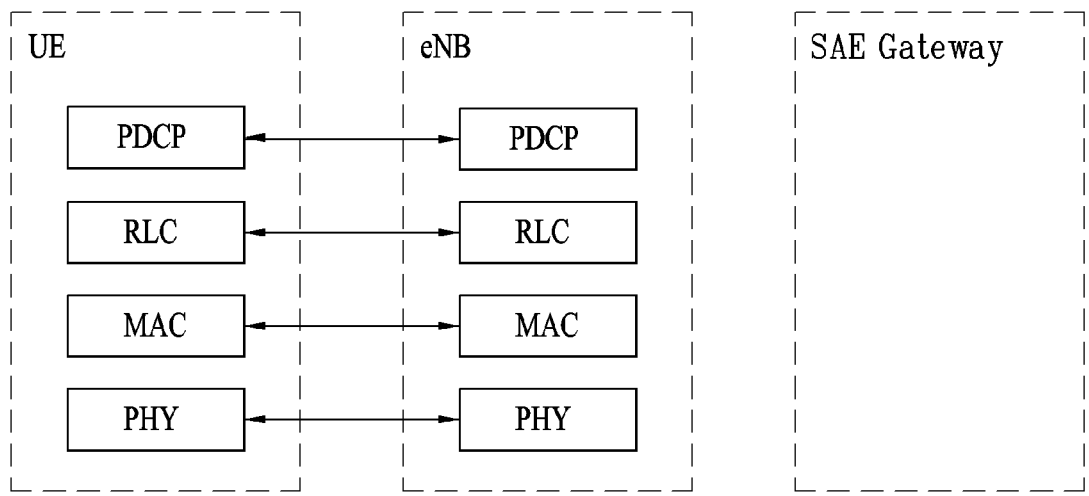
(B) USER-PLANE PROTOCOL STACK

COMMUNICATION METHOD FOR HIGH-SPEED MOVING VEHICLE IN WIRELESS COMMUNICATION SYSTEM, AND APPARATUS FOR SAME

This application is a 35 use § 371 national stage entry of international application no. PCT/KR2017/006635 filed on Jun. 23, 2017, and claims priority to U.S. provisional application No. 62/354,103 filed on Jun. 23, 2016, all of which are hereby incorporated by reference in their entireties as if fully set forth herein.

TECHNICAL FIELD

The present invention relates to a wireless communication system, and more particularly, to a method of performing communication for a vehicle moving at high speed in a wireless communication system and an apparatus therefor.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE OF THE INVENTION

Technical Task

Based on the aforementioned discussion, the present invention proposes a method of performing communication for a vehicle moving at high speed in a wireless communication system and an apparatus therefor.

Technical Solution

To achieve these and other advantages and in accordance with the purpose of the present invention, as embodied and broadly described, according to one embodiment, a method of transmitting and receiving a signal, which is transmitted and received to/from a network by a user equipment (UE) in a wireless communication system, includes the steps of, when the UE moves to a second base station from a first base station, if a measurement value measured from the first base station is equal to or less than a first threshold, monitoring a transmission of a first signal transmitted from the second base station, when the transmission of the first signal is sensed, transmitting a response signal to the second base station in response to the first signal, and when the second base station receives the response signal, receiving a second signal from the second base station.

To further achieve these and other advantages and in accordance with the purpose of the present invention, according to a different embodiment, a user equipment (UE) in a wireless communication system includes a wireless communication module and, when the UE moves to a second base station from a first base station, if a measurement value measured from the first base station is equal to or less than a first threshold, a processor configured to monitor a transmission of a first signal transmitted from the second base station, the processor, when the transmission of the first signal is sensed, configured to transmit a response signal to the second base station in response to the first signal, the processor, when the second base station receives the response signal, configured to receive a second signal from the second base station.

Preferably, the second signal corresponds to a data signal and the first signal corresponds to a control signal for receiving the second signal.

And, the first signal is beamformed to an estimated entering position of the UE in the coverage of the second base station. To this end, when the measurement value is equal to or less than the first threshold, it is preferable for the first base station to provide the second base station with information indicating that the UE is moving to the coverage of the second base station.

Additionally, when a measurement value for the first signal is equal to or greater than a second threshold, the feedback signal can be transmitted to the second base station.

Preferably, configuration information for receiving the first signal from the second base station can be received from the first base station in advance.

More preferably, when the UE is moving to the coverage of the second base station after deviating from the coverage of the first base station, the UE maintains a connection with a legacy base station. In particular, the first base station and the second base station transmit a signal through a first frequency band and the legacy base station transmits a signal through a second frequency band. In this case, configuration information for receiving the first signal from the second base station can be received from the legacy base station.

Advantageous Effects

According to embodiments of the present invention, a vehicle moving at high speed is able to efficiently perform communication in a wireless communication system in a situation that base stations are constructed in a manner of being distributed.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 is a diagram illustrating structures of a control plane and a user plane of a radio interface protocol between a UE and an E-UTRAN based on the 3GPP radio access network specification.

BEST MODE

Mode for Invention

Figure 1:
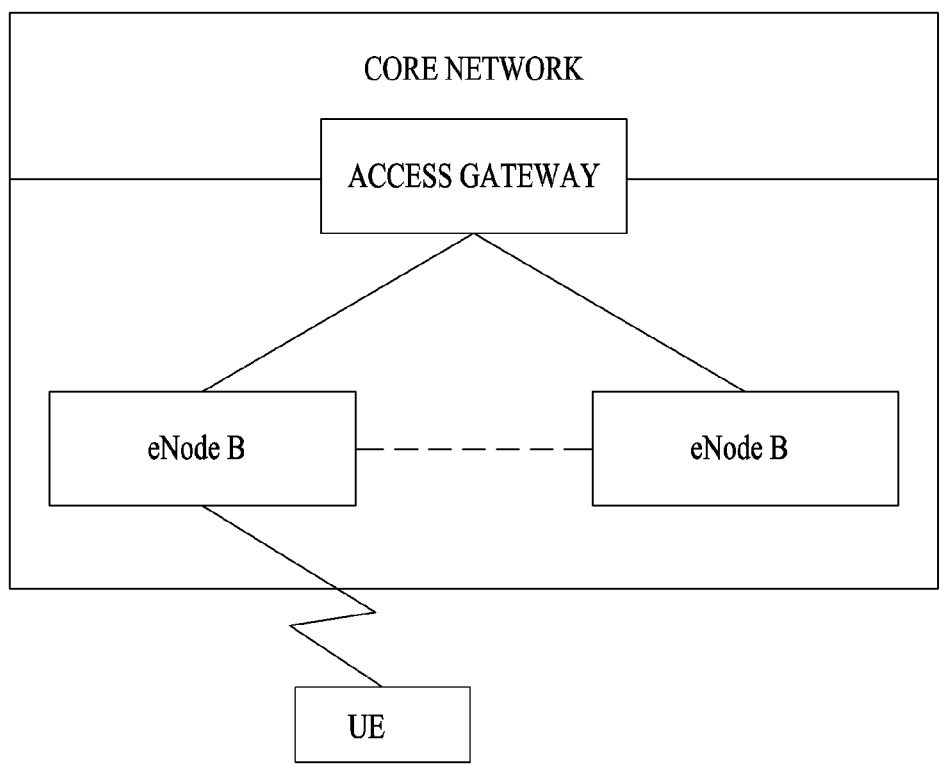
FIG. 1 is a diagram schematically illustrating a network structure of an E-UMTS as an exemplary radio communication system.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

A cell constructing an eNB is configured by one of bandwidths among 1.25, 2.5, 5, 10, 15, and 20 MHz and provides DL or UL transmission service to a plurality of UEs. Cells different from each other can be configured to provide a different bandwidth.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
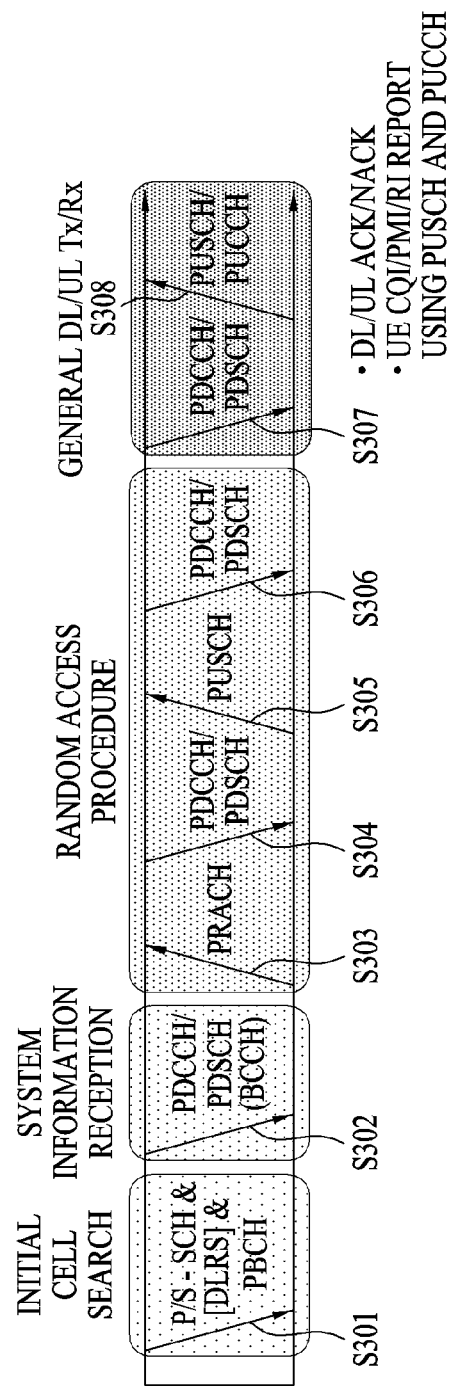
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
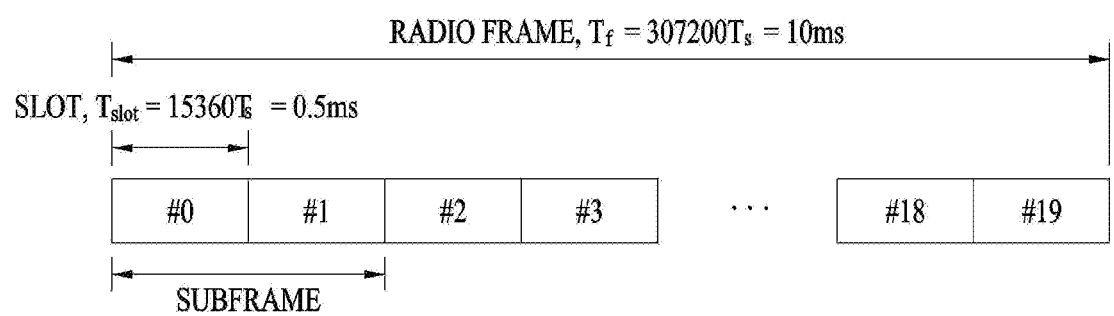
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1/(15 kHz× 2048)=3.2552×10−8 (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
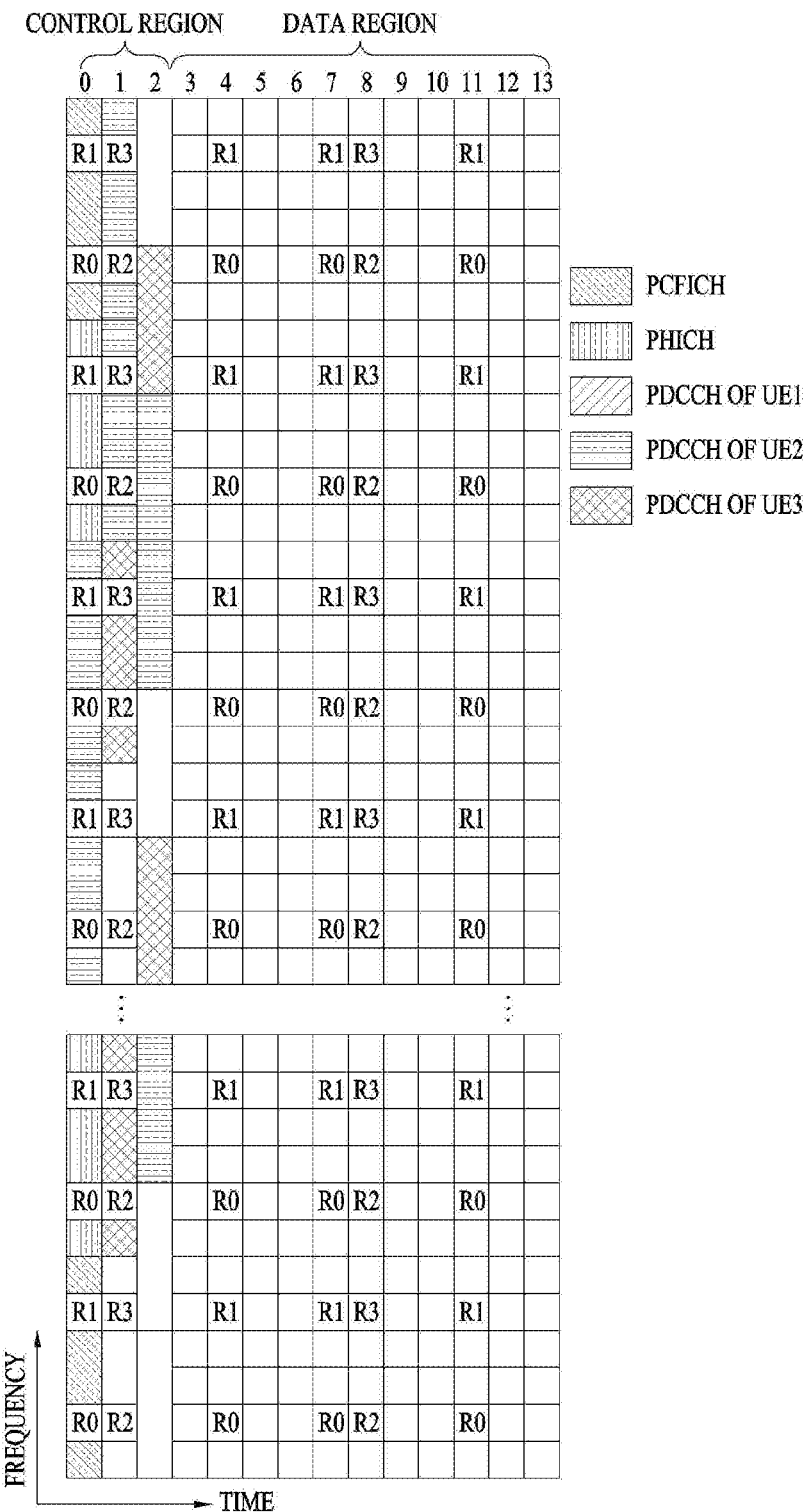
FIG. 5 is a diagram illustrating the structure of a DL radio frame used in an LTE system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
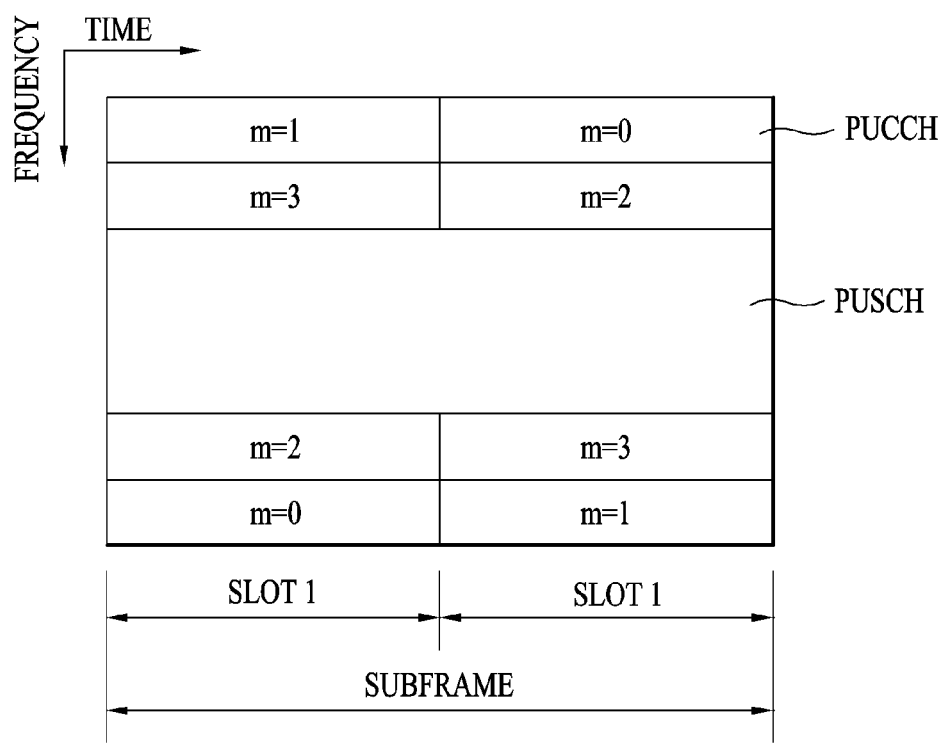
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Meanwhile, a wireless communication service is required to have a higher transfer rate. To this end, discussion on a method of providing a higher transfer rate through a wider bandwidth is in progress. However, since new and wide bands do not sufficiently exist on a frequency band to which a legacy wireless communication service is provided, discussion on a method of using a new frequency band (i.e., a band equal to or wider than 6 GHz) as radio communication is in progress. As a result of the development of various services applied to a vehicle, the need for the vehicle to perform wireless communication with a higher transfer rate is increasing. When the abovementioned high frequency band is used, it may be able to efficiently perform the wireless communication.

However, due to the characteristic of a high frequency band, it is difficult to utilize the high frequency band for a vehicle capable of moving at high speed. Since an electromagnetic wave of the high frequency band has severe pathloss, it is difficult to cover a wide area with a single base station. Hence, in order to provide a continuous communication service to a vehicle moving at high speed, since it is necessary to very closely install base stations, this may lead to excessive costs.

Hence, the present invention proposes a method of providing a wireless communication service to a vehicle moving at high speed using a high frequency band while base stations are installed with low density.

First of all, it is able to install base stations configured to provide a wireless communication service to a vehicle (i.e., a vehicle UE) with relatively low density using a high frequency band. In this case, the base stations are connected with each other via a backhaul link having relatively superior quality. This is intended, when a specific UE deviates from the coverage of a base station, to forward data used to be provided to the specific UE to an adjacent base station and make the adjacent base station promptly maintain a service.

And, a UE moving at high speed (i.e., a vehicle UE) can receive a wireless communication service with a high transfer rate using a wide bandwidth within the coverage of a specific base station. However, the UE deviates from the coverage of the base station within a short time period, fails to enter any coverage of a certain base station, and enters the coverage of a new base station. Since the UE does not stay at the coverage of the new base station for a long time, it is important for the UE to receive a communication service from a new base station as soon as possible.

Figure 7:
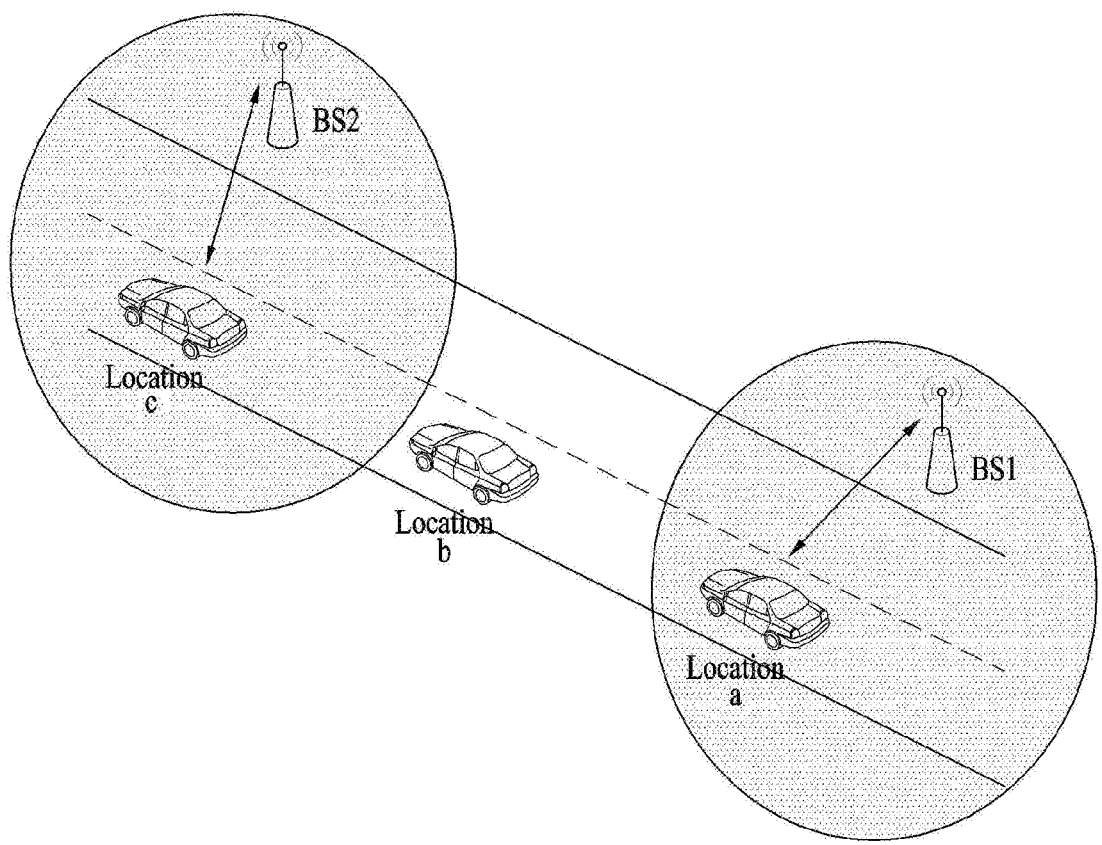
FIG. 7 illustrates situations that base stations to which the present invention is applied are installed and a vehicle moving at high speed receives a communication service.

FIG. 7 illustrates situations that base stations to which the present invention is applied are installed and a vehicle moving at high speed receives a communication service.

Referring to FIG. 7, a UE (i.e., a vehicle UE moving at high speed) performs communication with a base station 1 (BS1) at a location a with a high transfer rate. However, the UE does not belong to any coverage of a base station at a location b. Of course, in this case, the UE may maintain a communication service using a relatively lower transfer rate in a manner of being connected with a different base station providing wider coverage (i.e., a legacy base station) through a different frequency band. When the UE moves to a location c, the UE immediately establishes a connection with a base station 2 (BS2) and resumes communication of a high transfer rate. In particular, when the UE is moving to the coverage of the BS2 (e.g., location b) after deviating from the coverage of the BS1, the UE is able to maintain the connection with a network in a manner of being connected with the legacy base station.

<1. UE Movement Identified by Legacy Base Station>

When a response (e.g., HARQ-ACK in response to data transmitted by a specific UE in DL) is not received from the specific UE as many as a predetermined number during predetermined time, a legacy base station (e.g., BS1 in FIG. 7) can determine it as the specific UE has deviated from the coverage of the legacy base station. In particular, the legacy base station can determine whether or not the UE deviates from the coverage of the legacy base station based on a measurement report previously reported by the UE. For example, when strength of a signal transmitted by the base station is reduced with relatively fast speed, it can be estimated as the UE is deviating from the coverage of the base station.

In general, when a UE is moving at high speed, since a moving direction of the UE is simple, a base station is also able to speculate about the coverage of a certain base station into which the UE enters. Or, when the UE is able to identify location information or moving speed of the UE and report the location information or the moving speed of the UE to the base station, the base station can identify when the UE deviates from the coverage of the base station based on the report of the UE.

When the UE deviates from the coverage of the legacy base station, in order to make the UE promptly initiate a service in a next base station (e.g., BS2 in FIG. 7), the legacy base station can perform preparation in advance. For example, the legacy base station can hand over data stored in a buffer to a next base station through a backhaul link. Or, the legacy base station can inform the next base station of a trend of the measurement report, the location information of the UE, and the moving speed of the UE as well. Moreover, the legacy base station estimates when the UE is going to enter the coverage of the next base station based on the information and a distance from the next base station and can inform the next base station of the estimation result.

<2. Initialization of Communication at Next Base Station>

Meanwhile, when a UE is getting close to the coverage of a next base station, the UE should initiate communication as soon as possible.

As a method, when the next base station satisfies a predetermined condition (e.g., RSRP or RSRQ measurement value is equal to or greater than a predetermined level) and/or the legacy base station satisfies a predetermined condition (e.g., RSRP or RSRQ measurement value is equal to or less than a predetermined level), although there is no separate instruction from the legacy base station, the UE can perform an operation of requesting communication to the next base station.

Specifically, in a process that the UE performs connectivity request on the next base station, when the UE attempts to receive a downlink signal (e.g., a downlink control channel) of the next base station, the UE may attempt to receive a downlink signal of a predetermined level while not completely terminating the communication with the legacy base station. Specifically, a time/frequency resource for attempting to receive the legacy base station can be separated from a time/frequency resource for attempting to receive the next base station. By doing so, the UE can perform necessary communication by maintaining connection with the legacy base station while attempting to promptly establish a connection with the next base station. For example, when the UE receives a message indicating that a connection with the legacy base station is terminated from the legacy base station or the UE fails to promptly move to the next base station due to an anticipation error of UE mobility, the UE can continuously perform communication for maintaining the communication with the legacy base station.

Figure 8:
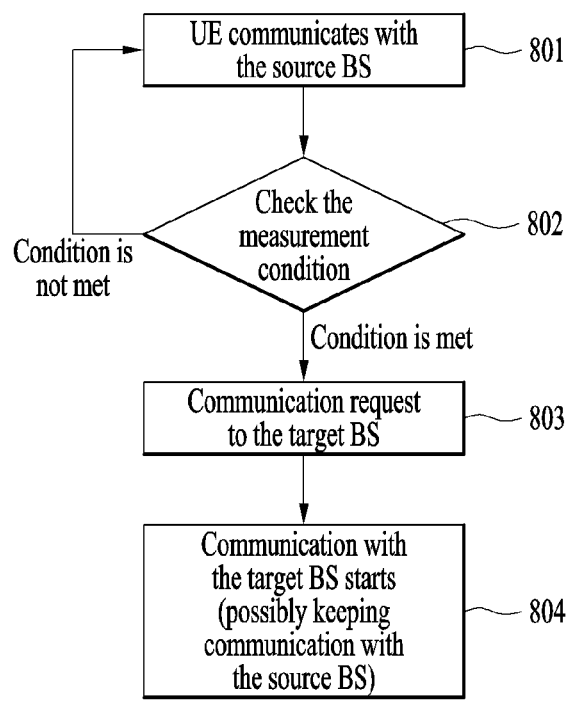
FIG. 8 illustrates a method for a UE to move to a next base station from a legacy base station according to an embodiment of the present invention.

FIG. 8 illustrates a method for a UE to move to a next base station from a legacy base station according to an embodiment of the present invention.

Referring to FIG. 8, in the step S801, assume that a vehicle UE moving at high speed (i.e., a UE) is communicating with a legacy base station (i.e., a source BS). In other word, assume that the UE moving at high speed is moving within the coverage of the source BS.

In this case, the UE can determine whether or not a measurement value satisfies a predetermined condition in the step S802. For example, the UE can determine whether or not such a condition as RSRP or RSRQ measurement value measured from a target BS corresponding to a next base station is equal to or greater than a predetermined level is satisfied and/or whether or not such a condition as RSRP or RSRQ measurement value measured from the source BS is equal to or less than a predetermined level is satisfied.

If the abovementioned condition is satisfied, the UE can forward a connection request to the target BS in the step S803. Moreover, as illustrated in the step S804, when the UE initiates communication with the target BS, the UE may attempt to receive a downlink signal of a predetermined level while not completely terminating the communication with the source BS corresponding to the legacy base station.

As a different method, the next base station can transmit a signal to the UE before the next base station establishes a connection with the UE based on movement anticipation of the UE. For example, the next base station identifies various information on the UE (e.g., an ID of the UE, a configuration to be used for attempting to receive a control channel, etc.), which is going to enter the coverage of the next base station before long, by exchanging a signal with the legacy base station in advance and transmits a control channel or a data channel to the UE immediately after the timing that the UE enters the coverage of the next base station.

Of course, if the UE does not completely enter the coverage of the next base station, there is no feedback on a corresponding transmission. On the other hand, the UE receives the transmission and transmits feedback in response to the transmission at the time of entering the coverage of the next base station. By doing so, the next base station identifies that the UE has entered the coverage of the next base station. Subsequently, the next base station can perform data transmission/reception in earnest. In particular, a signal transmission transmitted by the next base station at an early stage can be configured to use precoding (i.e., beamforming) showing an optimized gain at a location which is estimated as a coverage entrance location of the UE.

The UE can receive configurations for transmitting a downlink signal, which is to be received by the next base station, from the legacy base station. The configurations can include an ID of a UE to be used for receiving a signal by the next base station, control channel configuration information, PC (power control) information, and the like.

And, the UE may also receive a condition for initiating reception of a signal of the next base station. For example, the UE may attempt to perform an operation of receiving a signal of the next base station from the timing at which RSRP or RSRQ of the next base station is equal to or greater than a predetermined level or the timing at which RSRP or RSRQ of the legacy base station is equal to or less than a predetermined level. When the UE performs the operation, if the legacy base station is able to precisely estimate mobility of the UE, the UE may select a next base station and can perform the operation. However, if it is unable to guarantee the accuracy of the mobility estimation, the legacy base station informs the UE of a plurality of next base stations. The UE attempts to receive a downlink signal from a plurality of the next base stations. When the UE successfully receives a signal from a next base station, the UE can transmit a feedback to the next base station in response to the signal.

Of course, when the UE is moving to the coverage of a next base station after deviating from the coverage of the legacy base station, if the UE maintains a connection with the legacy base station, the UE can receive configurations for transmitting a downlink signal to be received in the next base station from the legacy base station.

Figure 9:
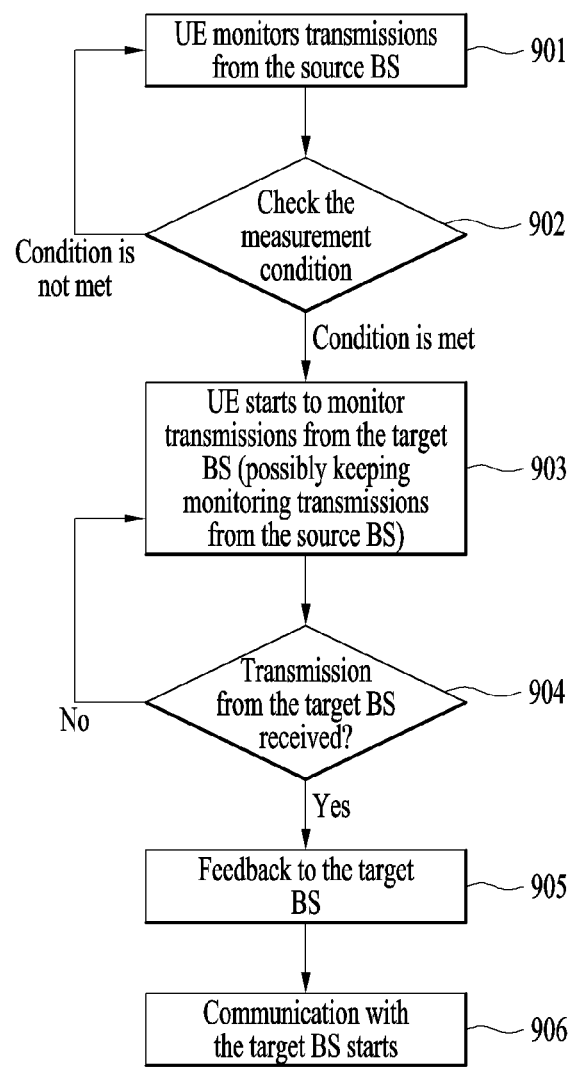
FIG. 9 illustrates a different method for a UE to move to a next base station from a legacy base station according to an embodiment of the present invention.

FIG. 9 illustrates a different method for a UE to move to a next base station from a legacy base station according to an embodiment of the present invention. In this case, assume that a target BS is able to transmit a signal to the UE before the target BS establishes a connection with the UE based on movement estimation of the UE.

Referring to FIG. 9, in the step S901, a vehicle UE moving at high speed (i.e., a UE) is able to continuously monitor predetermined transmissions transmitted by a source BS corresponding to a legacy base station. In the step S902, the UE can determine whether or not a condition for initiating reception of a signal of a next base station is met. In particular, the UE can determine whether or not RSRP or RSRQ measured from the source BS is equal to or less than a predetermined level.

If the condition of the step S902 is met, the UE initiates signal reception from a target BS corresponding to a next base station. Preferably, the UE may attempt to receive a downlink signal of a predetermined level while not completely terminating communication with the source BS corresponding to the legacy base station. When a vehicle UE deviates from the coverage of a legacy base station, if a moving path of the vehicle UE is changed via U-turn or the like before the vehicle UE enters the coverage of a next base station, the vehicle UE enters the coverage of the legacy base station again before a predetermined signal from a target BS is detected. In particular, in the aspect of continuity correction of communication, it is preferable to attempt to receive a downlink signal of a predetermined level without completely terminating a communication with a source BS.

In the step S904, the UE consistently monitors whether or not a signal is received from a target BS. If the UE receives a signal from the target BS, the UE transmits a feedback to the target BS in response to the signal in the step S905. By doing so, the target BS is able to identify that the UE has entered the coverage of the target BS. In particular, as illustrated in the step S905, the UE is able to transmit and receive data with the target BS in earnest.

When there exist a plurality of next base station candidates, it may be unnecessary for the UE to attempt to receive a signal from all of a plurality of the candidates depending on a measurement situation of the UE at specific timing. In particular, the UE may attempt to receive a signal from a base station where a signal capable of being actually received is measured only. However, a network may fail to identify the measurement situation. When it is necessary for the UE to attempt to receive a signal in a plurality of base stations, it is necessary to reduce reception capability of each of a plurality of the base stations. However, if the network does not precisely know the situation above, it may be impossible to correctly transmit a signal.

In order to solve the problem above, a base station assigns a priority to each of candidate locations at which a control signal is transmitted. A UE distributes the entire reception capability of the UE to base stations capable of performing reception. In this case, each of the base stations can be configured to attempt to receive a signal from a candidate location of a high priority first.

As a different method, a UE may periodically transmit a specific signal. When a next base station senses the specific signal, the next base station is able to identify that the UE has entered the coverage of the next base station. Specifically, as illustrated in the location b of FIG. 7, although the UE does not belong to any overage, the UE can continuously perform the periodic signal transmission.

When the UE does not belong to any coverage, it is necessary to have a synchronization reference to be used for transmitting a signal. For example, the synchronization reference can be used for storing synchronization information of a legacy base station and can be used as a reference for inducing time/frequency synchronization at transmission timing. Or, it may be able to transmit a signal by matching synchronization with a synchronization signal (e.g., a signal of a base station on a primary carrier having a wide coverage using a low frequency) of a base station using a different carrier.

A legacy base station estimates a location of a next base station into which a UE enters. In order to apply precoding having the maximum gain in the location to signal transmission, the legacy base station can inform the UE of an appropriate precoder (precoding matrix). If it is difficult to designate a single optimized precoder due to inaccuracy of a UE location, and the like, the legacy base station informs the UE of a plurality of precoders to make the UE use a plurality of the precoders together. Specifically, there is a method of changing a precoder in use at every transmission timing. Or, when a signal is transmitted at single timing, it may change a precoder based on a time/frequency resource position. As an example of a periodic signal, it may use a preamble SRS used for performing random access.

The periodic signal transmission can be performed under a predetermined condition. For example, it may be able to configure signal transmission to be initiated from the timing at which RSRP or RSRQ of a next base station becomes equal to or greater than a predetermined level and/or the timing at which RSRP or RSRQ of a legacy base station becomes equal to or less than a predetermined level. And, the periodic signal transmission can be maintained until a response is received from a target base station, until a UE enters the coverage of a third party base station other than a designated next base station, and/or until a predetermined timer expires.

An initialization operation of periodically transmitting a predetermined signal according to RSRP or RSRQ condition of a base station can be applied not only to a predetermined specific signal but also to resource allocation capable of transmitting general data.

For example, when a legacy base station designates a specific transmission resource to a UE, if RSRP or RSRQ of the legacy base station and/or a next base station satisfies the aforementioned specific condition, it may be able to configure data transmission to be initialized in the resource. The periodic resource allocation can be maintained until a response is received from a target base station, until a UE enters the coverage of a third party base station other than a next base station, and/or until a predetermined timer expires. By doing so, it is able to configure a UE moving at high speed to promptly initiate data transmission.

In addition, when a UE performs communication using a plurality of frequency carriers at the same time, if the UE configures a part of a plurality of the frequency carriers as a primary carrier and uses the primary carrier to transmit and receive main control information, it may be efficient to apply the aforementioned changing operation of the base station to a subcarrier rather than the primary carrier. For example, when the UE performs handover on the primary carrier according to a general procedure, the UE can apply the abovementioned operation in a process of changing a base station corresponding to a target of subcarrier communication with a next base station from a legacy base station. When a specific condition is met on the subcarrier, the UE can be configured to autonomously transmit a connection request to the next base station or can be configured to attempt to immediately receive a control channel of the next base station.

Figure 10:
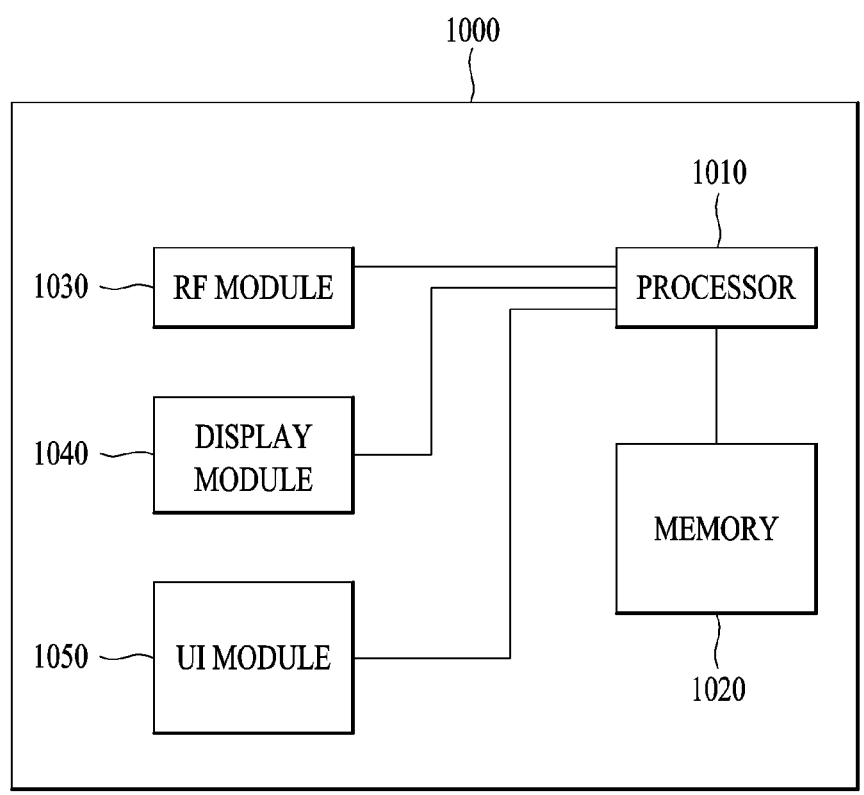
FIG. 10 is a block diagram of a communication apparatus according to an embodiment of the present invention.

FIG. 10 is a block diagram of a communication apparatus according to an embodiment of the present invention.

Referring to FIG. 10, a communication apparatus 1000 includes a processor 1010, a memory 1020, an RF module 1030, a display module 1040, and a User Interface (UI) module 1050.

The communication device 1000 is shown as having the configuration illustrated in FIG. 10, for the convenience of description. Some modules may be added to or omitted from the communication apparatus 1000. In addition, a module of the communication apparatus 1000 may be divided into more modules. The processor 1010 is configured to perform operations according to the embodiments of the present invention described before with reference to the drawings. Specifically, for detailed operations of the processor 1010, the descriptions of FIGS. 1 to 9 may be referred to.

The memory 1020 is connected to the processor 1010 and stores an Operating System (OS), applications, program codes, data, etc. The RF module 1030, which is connected to the processor 1010, upconverts a baseband signal to an RF signal or downconverts an RF signal to a baseband signal. For this purpose, the RF module 1030 performs digital-to-analog conversion, amplification, filtering, and frequency upconversion or performs these processes reversely. The display module 1040 is connected to the processor 1010 and displays various types of information. The display module 1040 may be configured as, not limited to, a known component such as a Liquid Crystal Display (LCD), a Light Emitting Diode (LED) display, and an Organic Light Emitting Diode (OLED) display. The UI module 1050 is connected to the processor 1010 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although a method for a vehicle moving at high speed to perform communication in a wireless communication system and an apparatus therefor are described with reference to examples applied to 3GPP LTE system, it may be applicable to various kinds of wireless communication systems as well as the 3GPP LTE system.

What is claimed is:

1. A method of transmitting and receiving signals with a network by a user equipment (UE) in a wireless communication system, the method comprising:

receiving, from a first base station, configuration information for receiving control signals from a plurality of second base stations;

when a measurement value related to the first base station is equal to or less than a first threshold while the UE is moving away from the first base station, monitoring the control signals transmitted from the plurality of second base stations in candidate resource regions, wherein each of the candidate resource regions corresponds to each of the plurality of second base stations;

detecting one of the control signals in one of the candidate resource regions;

transmitting a response signal to one of the plurality of second base stations corresponding to the one candidate resource region; and receiving a data signal from the one second base station, wherein, when a measurement value of the detected control signal is equal to or greater than a second threshold, transmitting the response signal comprises transmitting feedback information to the one second base station, wherein monitoring the control signals comprises monitoring the control signals in the candidate resource regions in a descending order of priorities of the candidate resource regions.

2. The method of claim 1, wherein the control signals are beamformed to anticipated entering positions of the UE in the coverage areas of the plurality of second base stations.

3. The method of claim 1, wherein when the measurement value related to the first base station is equal to or less than the first threshold, the first base station provides the plurality of second base stations with information indicating that the UE is moving towards the coverage areas of the plurality of second base stations.

4. An apparatus for wireless communications, comprising:

a memory; and at least one processor operatively coupled to the memory and configured to:

receive, from a first base station, configuration information for receiving control signals from a plurality of second base stations;

when a measurement value related to the first base station is equal to or less than a first threshold while the apparatus is moving away from the first base station, monitor the control signals transmitted from the plurality of second base stations in candidate resource regions, wherein each of the candidate resource regions corresponds to each of the plurality of second base stations;

detect one of the control signals in one of the candidate resource regions;

transmit a response signal to one of the plurality of second base stations corresponding to the one candidate resource region; and receive a data signal from the one second base station, wherein, when a measurement value of the detected control signal is equal to or greater than a second threshold, the at least one processor is configured to transmit feedback information to the one second base station, wherein the control signals are monitored in the candidate resource regions in a descending order of priorities of the candidate resource regions.

5. The apparatus of claim 4, wherein the control signals are beamformed to anticipated entering positions of the UE in the coverage areas of the plurality of second base stations.

6. The apparatus of claim 4, wherein when the measurement value related to the first base station is equal to or less than the first threshold, the first base station provides the plurality of second base stations with information indicating that the apparatus is moving towards the coverage areas of the plurality of second base stations.

* * * * *